United States Patent [19]

Higgins et al.

[11] Patent Number: 5,477,241

[45] Date of Patent: Dec. 19, 1995

[54] METHOD OF RESETTING A COMPUTER VIDEO DISPLAY MODE

[75] Inventors: Paul J. Higgins, Sebastopol; Scott D. Vouri, Petaluma, both of Calif.

[73] Assignee: Binar Graphics Incorporated, San Rafael, Calif.

[21] Appl. No.: 124,386

[22] Filed: Sep. 20, 1993

[51] Int. Cl.$^6$ .................................................. G09G 5/00
[52] U.S. Cl. ........................ 345/127; 345/132; 345/902; 395/155
[58] Field of Search ..................................... 345/118, 119, 345/127, 132, 146, 902, 131, 138; 395/155, 156, 157, 161, 128, 139, 102

[56] References Cited

U.S. PATENT DOCUMENTS

| | | | |
|---|---|---|---|
| 4,672,683 | 6/1987 | Matsueda | 382/57 |
| 4,831,556 | 5/1989 | Oono | 345/127 |
| 4,837,635 | 6/1989 | Santos | 358/401 |
| 4,931,956 | 6/1990 | Stapleton | 364/521 |
| 4,954,970 | 9/1990 | Walker et al. | 364/521 |
| 5,051,929 | 9/1991 | Tutt et al. | 364/521 |
| 5,065,346 | 11/1991 | Kawai et al. | 395/128 |
| 5,119,081 | 6/1992 | Ikehira | 340/723 |
| 5,142,616 | 8/1992 | Kellas et al. | 395/135 |
| 5,179,639 | 1/1993 | Taaffe | 395/128 |
| 5,227,771 | 7/1993 | Kerr et al. | 395/157 |
| 5,265,246 | 11/1993 | Li et al. | 395/600 |

OTHER PUBLICATIONS

Aldus Photostyler, User Manual, Second Edition Jun. 1992, pp. 66–69, 86–87, 90–91, 94–99, 176–181.

*Primary Examiner*—Richard Hjerpe
*Assistant Examiner*—Steven J. Saras
*Attorney, Agent, or Firm*—Hickman & Beyer

[57] ABSTRACT

A screen commanding utility is provided that permits a user to select the number of display pixels are used to represent a designated unit length of printed output in a computer system's display screen. The screen commander is arranged to determine the location(s) at which the operating system stores the current DPI setting. Then, when a command is received from a user to adjust the DPI settings, the desired new DPI setting are stored in the current DPI settings location(s).

20 Claims, 8 Drawing Sheets

METHOD OF RESETTING A COMPUTER VIDEO DISPLAY MODE

BACKGROUND OF THE INVENTION

The present invention relates generally to a mechanism for adjusting selected video display characteristics in a computer system. More particularly, an arrangement for controlling the number of dots that are displayed on a video screen per inch of printed output (DPI) is described.

In most modern personal computer systems, the video display monitor is controlled by a dedicated video card that has a plurality of software based display drivers. The operating system selects which display driver is to be used and then stores information about the screen characteristics (as dictated by the selected driver). That information is then used by both the operating system and any application that has the need to know any screen characteristics. One characteristic that the display driver must set is the number of display pixels that will be used to represent one inch of printed output. This is commonly referred to as the display's DPI (dots per inch). The DPI characteristics must be set in both the horizontal (X) and vertical (Y) directions. Although it is not required, it is common to use the same DPI value for both the horizontal and the vertical directions so that the displayed image is not distorted.

For a variety of reasons, the number of dots per inch indicated by the display driver to represent an inch of output commonly occupy more than an inch of screen space. One explanation is the assumption that the screen resolution is generally not as good as the resolution of printed matter so it is easier on the user's eyes when the displayed materials are larger than the printed text. Another reason may be that users tend not to sit as close to a video display as they would hold a piece of paper. In any event, the values selected by the display drivers are not always optimal for specific user needs. For example, users of desktop publishing software commonly prefer that the image displayed have exactly the same measurements as the printed output. Other users may wish to have the displays appear larger so that text can be read more easily or may wish a page (or portion thereof) to occupy a fixed portion of the screen or the entire screen.

Currently, one of the most popular operating systems for IBM PC compatible personal computers is the MS-DOS based Windows operating system marketed by Microsoft Corporation. In Windows, like most DOS based systems, it is not possible to change the displayed DPI for any particular display driver. The size of the displayed information can be altered somewhat by a variety of stop gap measures. However, none give the user real control over the display size. For example, one common approach in word processing applications is to change the font size of the text during inputting and editing. However, requiring the user to change font sizes is inconvenient and can lead to all kinds of formatting difficulties. Another approach is to switch the screen resolution. However, (in order to switch the screen resolution, it is typically necessary to exit any open application(s), exit Windows in Windows based systems) and then change the screen resolution in DOS. This is typically accomplished by loading a new driver program, or in the case of changing the screen resolution using a multi-resolution driver, the application requesting the new resolution saves the desired resolution values to the disk before exiting Windows. After the new driver has been loaded (or the appropriate resolution values saved), both Windows and the desired application programs must be restarted. Obviously, this procedure is slow and cumbersome. Further, when the resolution is changed, the user is limited to the DPI associated with the newly selected resolution, which may not be satisfactory.

In view of these drawbacks, a system arranged to give the user the ability to control the number of display pixels that are used to represent a given distance of print output would be desirable. Accordingly, it is an object of the present invention to provide such a system.

SUMMARY OF THE INVENTION

To achieve the foregoing and other objects and in accordance with the purpose of the present invention, a screen commanding mechanism and user interface is provided that permits a user to select the number of display pixels are used to represent a designated unit length of printed output in a computer system's display screen. The screen commander is arranged to determine the locations at which the operating system stores the current DPI setting. Then, when a command is received from a user to adjust the DPI settings, the desired new DPI setting are stored in the current DPI settings location.

In a preferred user interface aspect of the invention, a DPI settings dialog box is displayed when the user chooses to review or alter the DPI settings. In a preferred embodiment, the dialog box includes a pair of graphic rulers that display respective horizontal and vertical desired DPI settings in the form of rulers. Each ruler may have an associated slider bar having a slider thereon that the user may use to adjust the desired DPI setting. Additionally, a plurality of display boxes may be provided for displaying the current and desired DPI settings in alphanumeric form. In another preferred embodiment, a button may be provided to permit the user to automatically select the default DPI settings as the desired DPI settings.

In a preferred method aspect of the invention, the current DPI setting are stored in a designated data structure, the desired DPI setting are also stored in non-volatile memory so that at system startup time, the system can be set up to automatically reload the last desired DPI setting associated with the particular resolution.

BRIEF DESCRIPTION OF THE DRAWINGS

The invention, together with further objects and advantages thereof, may best be understood by reference to the following description taken in conjunction with the accompanying drawings in which.

DETAILED DESCRIPTION OF THE INVENTION

Figure 1:
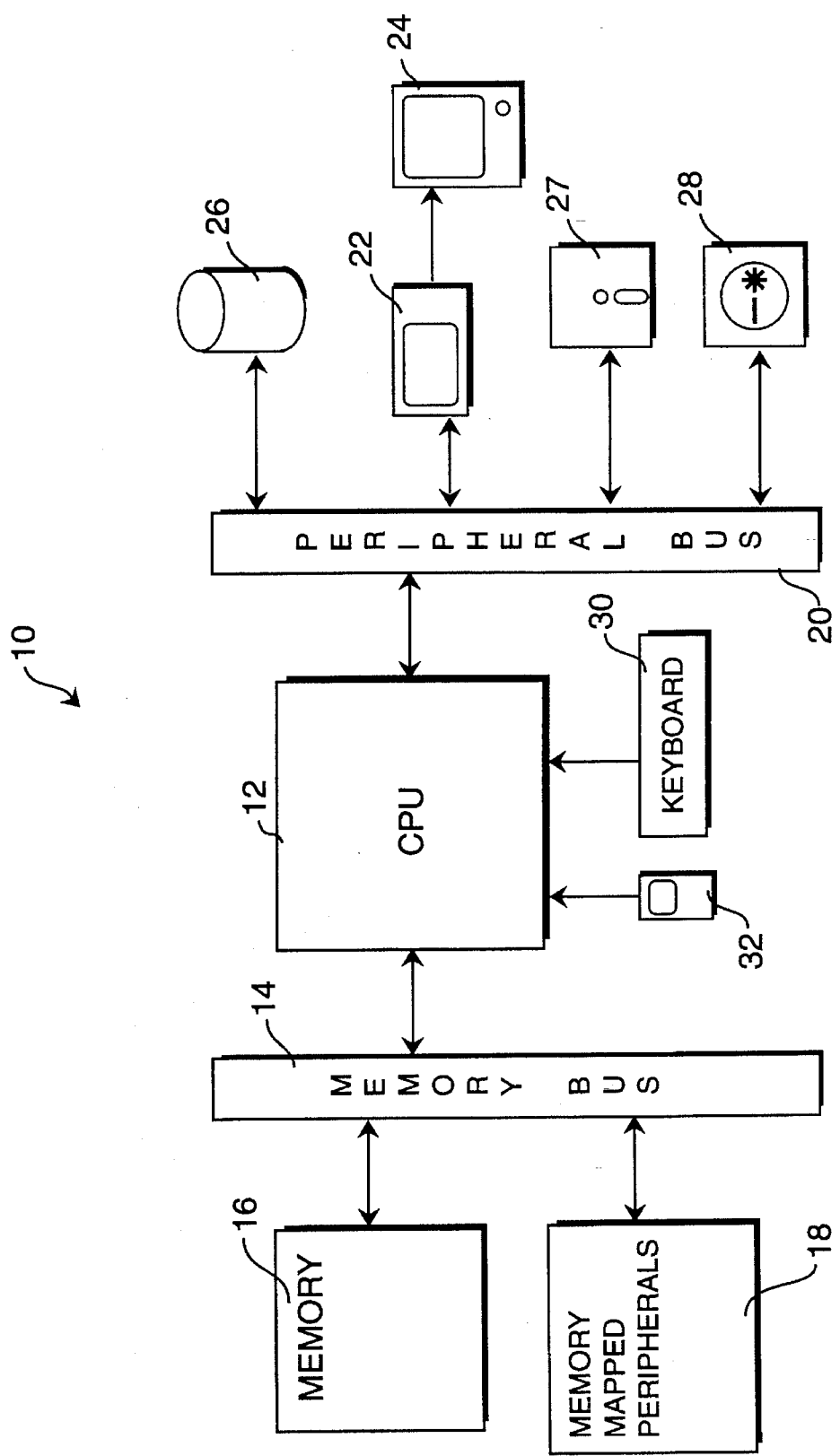
FIG. 1 is a block diagram of a computer system that is suitable for operating the present invention.

As shown in FIG. 1, a computer system 10 suitable for executing the present invention includes a central processing unit (CPU) 12, a bi-directional memory bus 14 which couples the CPU to memory 16 and memory mapped peripherals 18, and a bi-directional peripheral bus 20 which connects the CPU to a variety of peripheral devices. The memory 14 typically takes the form of both read only memory (ROM) and random access memory (RAM). Memory mapped peripherals typically include video adapters and data storage devices. A variety of peripheral devices can be coupled to the peripheral bus 20. By way of example, peripherals devices that are frequently connected to the peripheral bus include a video card 22 which controls a display monitor 24, a Winchester type hard disc drive 26, a floppy disc drive 27 and/or CD ROM 28. Additionally, a keyboard 30 and a pointer device 32 such as a mouse or track ball are typically connected directly to the CPU 12. Both the keyboard and the pointer device are arranged to function as user input devices. As will be appreciated by those skilled in the art, a wide variety of other peripheral devices can be connected to either the peripheral bus or the memory bus and the buses which connect the described peripherals to the CPU can be switched and/or additional buses can be added.

The video display controlling utility of the present invention may be applied to a variety of computer systems running a variety of different operating systems. However, for the purposes of illustration the described embodiment will take the form of a utility program for use with a personal computer that is executing an MS-DOS based "Windows" operating system marketed by Microsoft Corporation. Accordingly, the described embodiment is icon-based which gives the user quick access to its most often used features.

The described embodiment of the present invention is divided into portions. The first portion includes the user interface which is based in an application program. For the purposes of the description that follows, a general familiarity with the "Microsoft Windows Software Developers Kit," (SDK) version 3.1 (1992) which is published by Microsoft Corp. is assumed. The second portion of the invention is based in the display driver and is required to facilitate communication with the computer hardware. For the purposes of the description, a general familiarity of the "Microsoft Windows Device Drivers Developers Kit", (DDK) version 3.1 (1992) which is published by Microsoft Corp. is assumed. Additionally, as is well know to those skilled in the device driver programming for Windows art, the reference "Undocumented Windows" written by Schulman et al. and published by Addison Wesley in 1992 is a great help when writing driver level code and a generally familiarity with its contents is assumed. Each of these references is incorporated herein by reference. Familiarity with the programming in the Windows operating system environment will be assumed for the purposes of this application.

In the described embodiment, the driver is set up somewhat different than many display drivers. Specifically, at Windows run time, only the intermediary driver utility is installed. The intermediary driver utility is a small section of code with a pointer table. The bulk of the code is saved in driver "libraries" such that each supported color depth has a unique library. Thereafter, when Windows makes its first call to the driver, the driver library for the selected color depth is loaded and initialized. The described intermediary driver installation technique is particularly well suited for use with the present invention since it allows the DPI settings to be recorded regardless of which driver is selected, without requiring each driver to be modified to record the settings.

Figure 2:
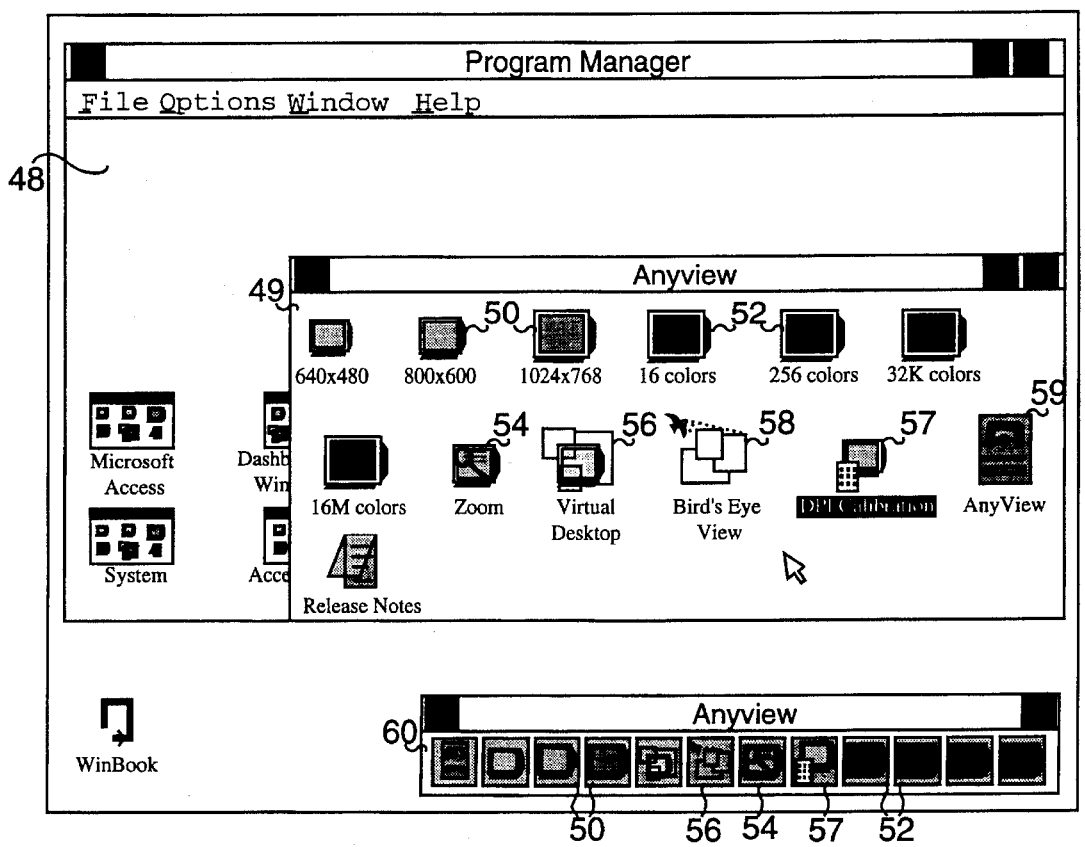
FIG. 2 is a screen display showing a representative opened window that contains a Windows based user interface for a computer display mode controlling utility in accordance with the present invention.

The application program based icon interface portion of the present invention may be stored in the program manager window 48 of Windows. The utility window 49 that contains the utilities of the present invention is referred to as the Anyview™ utility window in the drawings. As seen in FIG. 2, the utility window 49 has a multiplicity of icons therein that can be selected by the user. By way of example, the utility window 49 may include a plurality of screen resolution icons 50, a plurality of color depth icons 52, a zoom icon 54, a virtual desktop icon 56, a DPI calibration icon 57, a bird's eye view icon 58, and other icons 59 which permit the user to control the video display in other manners. The function and operation of the utilities represented by the screen resolution icons 50, the color depth icons 52, the zoom icon 54, the virtual desktop icon 56 and the bird's eye view icon 58 are described in applicant's co-pending application Ser. No. 08/023,945 filed Feb. 26, 1993, now U.S. Pat. No. 5,420,605, which is incorporated herein by reference.

In addition to the icon based user interface described above, a toolbar 60 is provided. The user may optionally have the toolbar displayed at all times. The toolbar 60 has a number of icons therein. The user is permitted to add any of the icons in the utility window 49 to the toolbar. When the user selects an icon in the toolbar, the corresponding function is executed just as if the icon has been selected from the utility window 49. Thus, the user is provided with a mechanism for adding icons to and removing icons from the toolbar. The toolbar editing interface is opened by selecting an appropriate editing command from a pull down menu which displays a dialog box. The toolbar editing interface is described in the referenced application.

The DPI calibration icon 57 activates the user interface for the utility of the present invention. More specifically, the DPI calibration icon represents a utility which is intended to give the user the power and flexibility to set the number of pixels in the display monitor that are displayed to represent a designated length of printed output when the displayed information is printed. In the United States, the number of display pixels allotted per unit of printed output is usually referred to as the number of dots (i.e. pixels) per inch, which gives rise to the acronym "DPI". The described feature has several uses. For example, in windows applications, one complaint that is frequently voiced by users of desktop publishing software is that what is displayed on the screen is not sized the same as the printed output. By giving the users the ability to calibrate the screen's DPI, this problem can be eliminated. Other users may wish to vary the displayed DPI in order to increase or decrease the size of the displayed information to meet a particular need, without altering the screen resolution.

Figure 3:
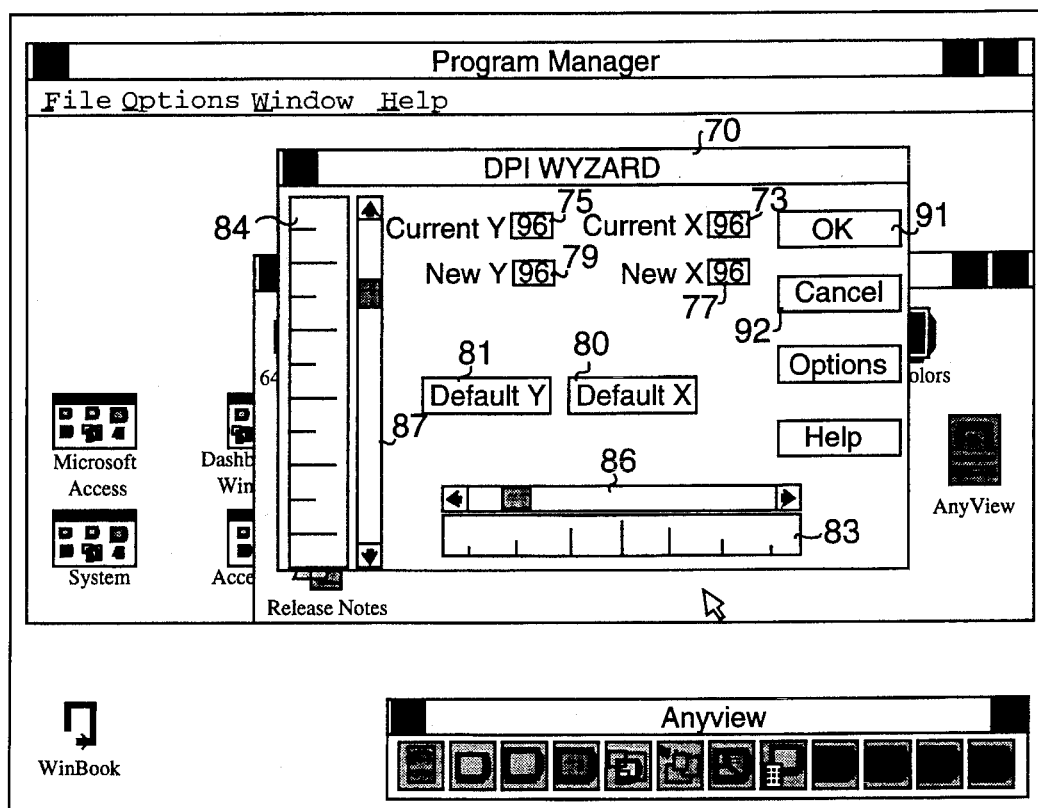
FIG. 3 is a screen display showing a dialog box style user interface that permits a user to set the number of dots per inch that are displayed.
Figure 4:
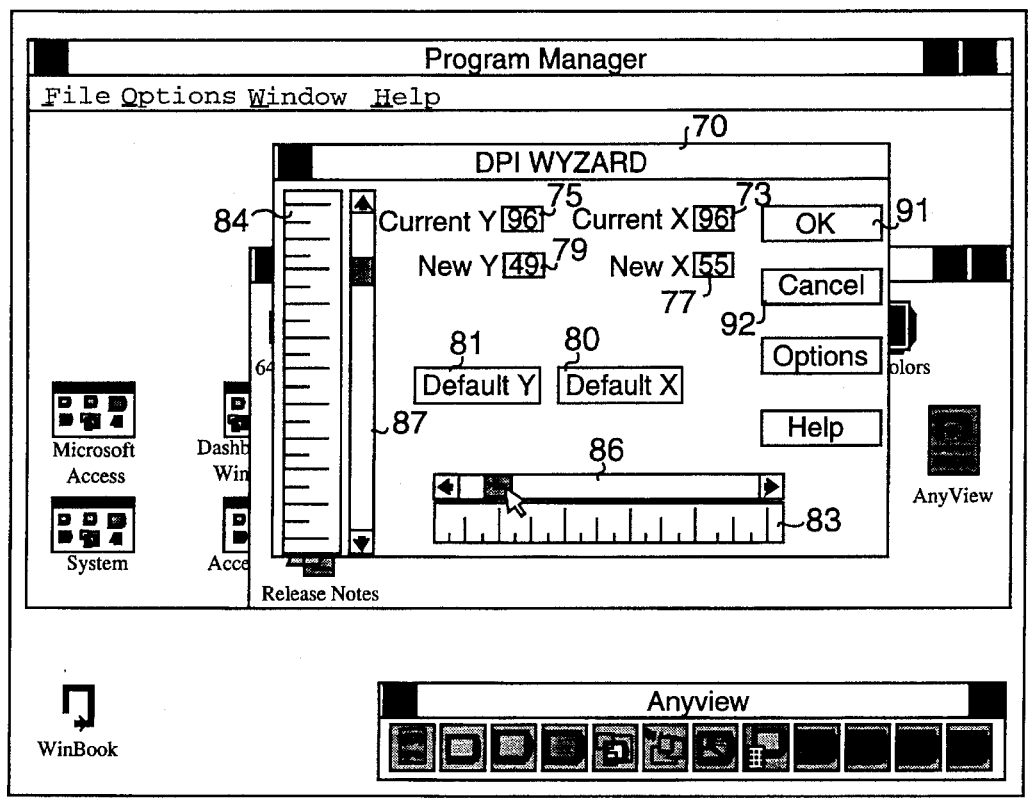
FIG. 4 is the screen display shown in FIG. 3 after the user has altered the DPI settings.

When the DPI calibration icon 57 is selected, a DPI editing dialog box 70 is displayed. A representative dialog box is shown in FIGS. 3 and 4. In the embodiment shown, the dialog box 70 displays the current DPI settings in both the horizontal (X) and vertical (Y) directions. The horizontal setting 73 is labeled "Current X" and the vertical setting 75 is labeled "Current Y" in the drawings. Additionally, any newly selected DPI settings (77 and 79 for the new horizontal and vertical settings respectively) are displayed adjacent the labels "New X" and "New Y" respectively. Further, buttons 80 and 81 are provided to enable the user to automatically reselect the original default DPI settings that were provided by the display driver. The "newly selected" DPI settings are also graphically displayed using rulers 83 and 84. The rulers 83 (for horizontal) and 84 (for vertical) are drawn to scale as seen by the display so that one unit display length as shown on the ruler equals one unit length of printed output. For the purposes of this discussion, the unit length will be one inch, although any other unit length could be used in its place. In the embodiment shown, quarter and half inch markers are made as well.

In order to input new desired DPI settings, the user may either type the desired settings into the appropriate boxes 77 and 79, or may use the handy graphical rulers 83, 84 and their associated slider bars 86, 87. To adjust the DPI settings using the rulers, the user "grabs" the slider on the slider bar and moves it. When the slider is moved, the length of the DPI setting is adjusted accordingly. Thus, by way of example, if a user wants the display to have identical dimensions as the printed output, the user can place a ruler against the screen and adjust the slider until an inch on the screen equals an inch on the ruler. Proportional adjustments can be done in the same way. Alternatively, the user can simply move the slider to a position that is subjectively appealing. As the slider is moved, the values of the corresponding DPI settings are displayed in the appropriate newly selected DPI setting box 77 or 79. When the default buttons 80 and/or 81 are selected, the corresponding default values are displayed in the associated ruler and newly selected DPI setting box.

A representative change in the desired DPI settings is shown in FIG. 4. As can be seen therein, the horizontal DPI settings has been changed from the original "default" setting of 96 DPI (which is the "current" DPI setting) to a new setting of 55 DPI. Similarly, the vertical DPI setting has been changed from the default (again 96 DPI) to 49 DPI. As can be seen in the figure, both the horizontal and vertical rulers are redrawn to scale in order to give the user a graphical image of the newly chosen settings.

The manner in which the ruler is drawn is straight forward. In essence, the reference (i.e. zero inches) is located at a fixed point within the dialog box. The ruled dimensions are then calculated based on the "new" DPI settings. Then, the properly scaled ruler is drawn. Thus, the inch mark is drawn at a location that is X pixels (for the horizontal ruler) or Y pixels (for the vertical ruler) away from the reference. The location of the half and quarter marks are easily calculated on a proportional basis. Then, as many additional marks are drawn as are appropriate for the ruler which is of a fixed length within the dialog box.

The dialog box 70 also has four buttons labeled "OK", "Cancel", "Options", and "Help". The "O.K." button 91 is intended to be selected when the user is satisfied with the selected DPI settings. Activation of the "O.K." button will cause the newly selected DPI settings to be stored and implemented. The "Cancel" button 92 is intended to be selected when the user does not wish to change the current DPI settings. Selection of the "Options" button 93 causes a options dialog box 95 to be displayed. Selection of the "Help" button 94 is intended to provide the user with assistance on the use of the dialog box 70.

Figure 5:
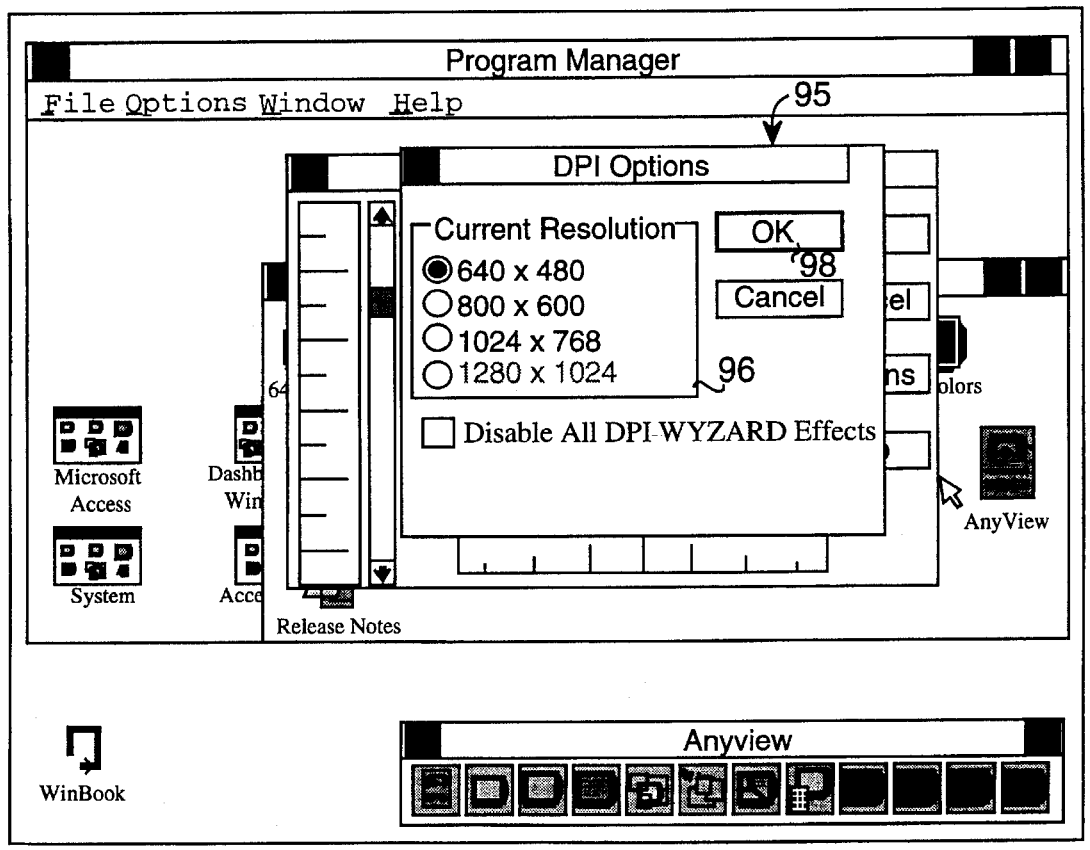
FIG. 5 is a screen display showing a DPI Options dialog box suitable for use in a system capable of supporting multiple screen resolutions.

The options dialog box 95 will be described with reference to FIG. 5. The options box permits the user to select the desired DPI settings for each resolution in a system arranged to support a plurality of screen resolutions. As will be appreciated by those skilled in the art, the default DPI settings are often varied based upon the screen resolution. For example, windows based drivers typically set the DPI settings to 96 dots per inch in resolutions bellow 1024×768 while resolutions of 1024×768 and above are typically set to 120 dots per inch. For a variety of reasons, the user may not wish to have the same DPI settings for each potential resolution, especially in systems having a screen commanding utility that permits on the fly resolution switching as described in the above referenced co-pending application. Therefore, the described embodiment permit users to vary the DPI settings for each resolution. The options box permits the users to adjust the DPI settings with respect to each supported screen resolution.

The option dialog box 95 includes a resolution choosing box 96 that lists each resolution supported by the driver. By selecting a particular resolution, the user can adjust the DPI settings associated with the selected resolution. After the appropriate resolution has been selected, the user may enter the chosen resolution by selecting the OK button 98. Alternatively, if the user simply wishes to cancel the options box 95, they may do so by selecting the Cancel button 99. When either the Cancel or OK button has been chosen, the user will be returned to dialog box 70 which permits editing of the DPI settings for the selected resolution.

Figure 6:
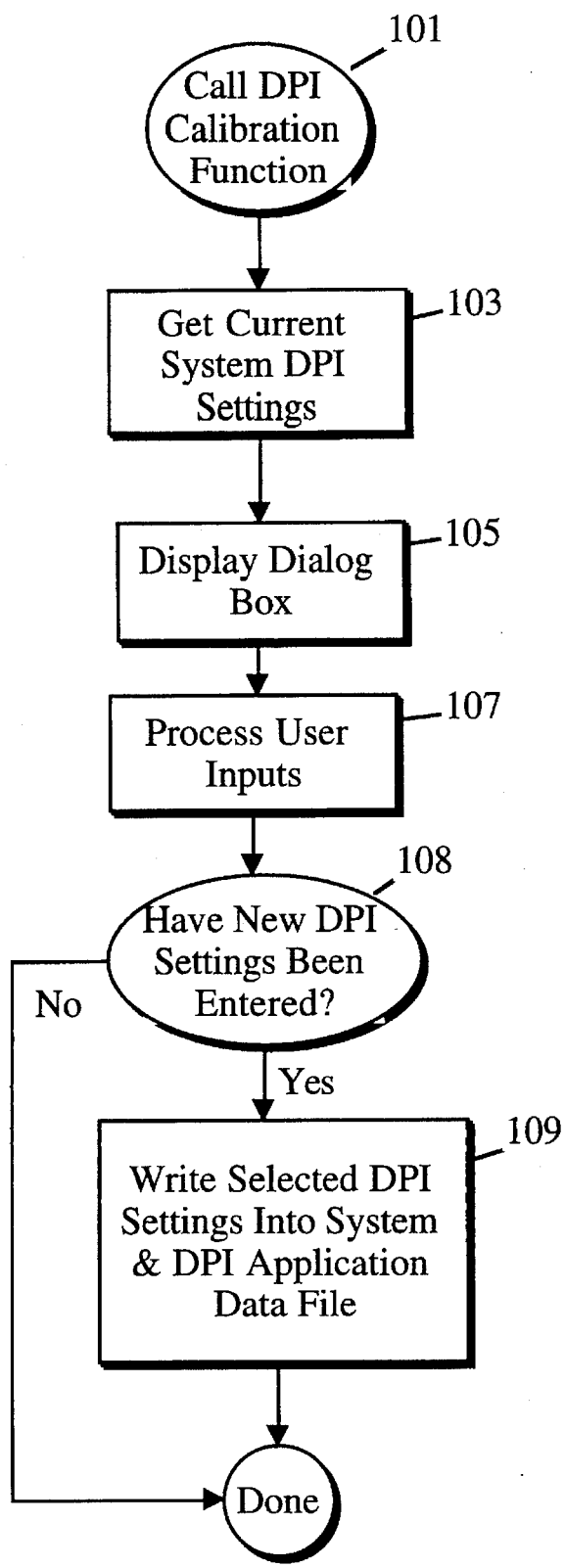
FIG. 6 is a flow diagram illustrating a suitable process for altering the DPI setting in a computer system.

Referring next to FIGS. 6–9, a method of switching the DPI settings in accordance with the present invention will be described. Turning initially to FIG. 6, the process begins at step 101 when the user enters a command that calls the DPI calibration function. In practice, this is normally done by selecting the DPI calibration icon 57 that is located in either utility window 49 or the toolbar 60. Alternatively, the call could be generated by the acts of selecting a menu item in a pull down menu, by inputting a keyboard commands or in any other suitable manner. When the DPI calibration function is called, the logic moves to step 103 where the current system DPI settings are obtained. That is, the settings in both the X and Y directions. By way of example, in a Windows based operating system, this may be accomplished by making two "Get Device Caps" calls (one for each axis). Once the current settings have been obtained, the logic moves to step 105 where it displays the dialog box 70. After the dialog box has been displayed, the logic moves to step 107 where any user inputs are processed. Newly selected DPI settings will be among the user inputs. When the user is finished making any inputs the logic effectively goes to step 108 where it determines whether the user has selected any new DPI settings. The processing step 107 is completed when the user selects either the "OK" button 91 or the "Cancel" button 92. In the described embodiment, when the dialog box is displayed in step 105, the current DPI settings are inserted as the initial "new" DPI settings. With this arrangement, anytime the user selects the "OK" button, the system assumes that there is a new entry and the logic proceeds from step 108 to step 109. On the other hand, anytime the "Cancel" button 92 is selected, the logic assumes that no new entries are desired and the result of step 108 is that no new DPI settings are to be entered. In this case, the process is completed. In step 109 the newly selected DPI settings are written into the system and a DPI data file. After the newly selected DPI settings have been stored, the DPI calibration routine is completed.

The selected X and Y DPI settings are written into the operating system by writing the desired value to the memory offset location where the DPI settings are stored. Of course, the actual memory offset locations are expected to vary from system to system, from machine to machine and even between boots on the same machine with some operating systems. In many operating systems, such as DOS based Windows systems, the operating system sends a request to the display driver during initialization, asking the display driver to give the system information about the video display's characteristics. Among the information returned are value indicative of the DPI settings in both the horizontal and vertical directions. When this information is returned, it is important for the screen commanding utility to detect where the DPI settings information is stored. This is done at system startup. That is, when the operating system is launched. When the operating system is launched, the screen commanding utility will record the offset in the GDI (Graphic Device Interface) info structure (or its equivalent) where the system stores the DPI settings. In most operating systems, this information is stored only at one location and will not be moved. Of course, if the information is stored in more than one spot, it would be necessary to either record or search for the other locations as well.

When a particular application requires information about the DPI settings, a request is made (a "Get Device Caps" request in Windows) to the system to return these values. The request is responded to by providing the values stored in the designated DPI settings memory offset location. Therefore, in order to change the DPI settings, the screen commander application only need to write the desired DPI settings in the designated memory offset location.

In step 109, the logic also saves the desired DPI settings in a DPI Application Data File. As will be explained in more detail below with reference to FIG. 9, this data file is used to save the settings so that they can be reused after the system has been shut down and rebooted.

Figure 7:
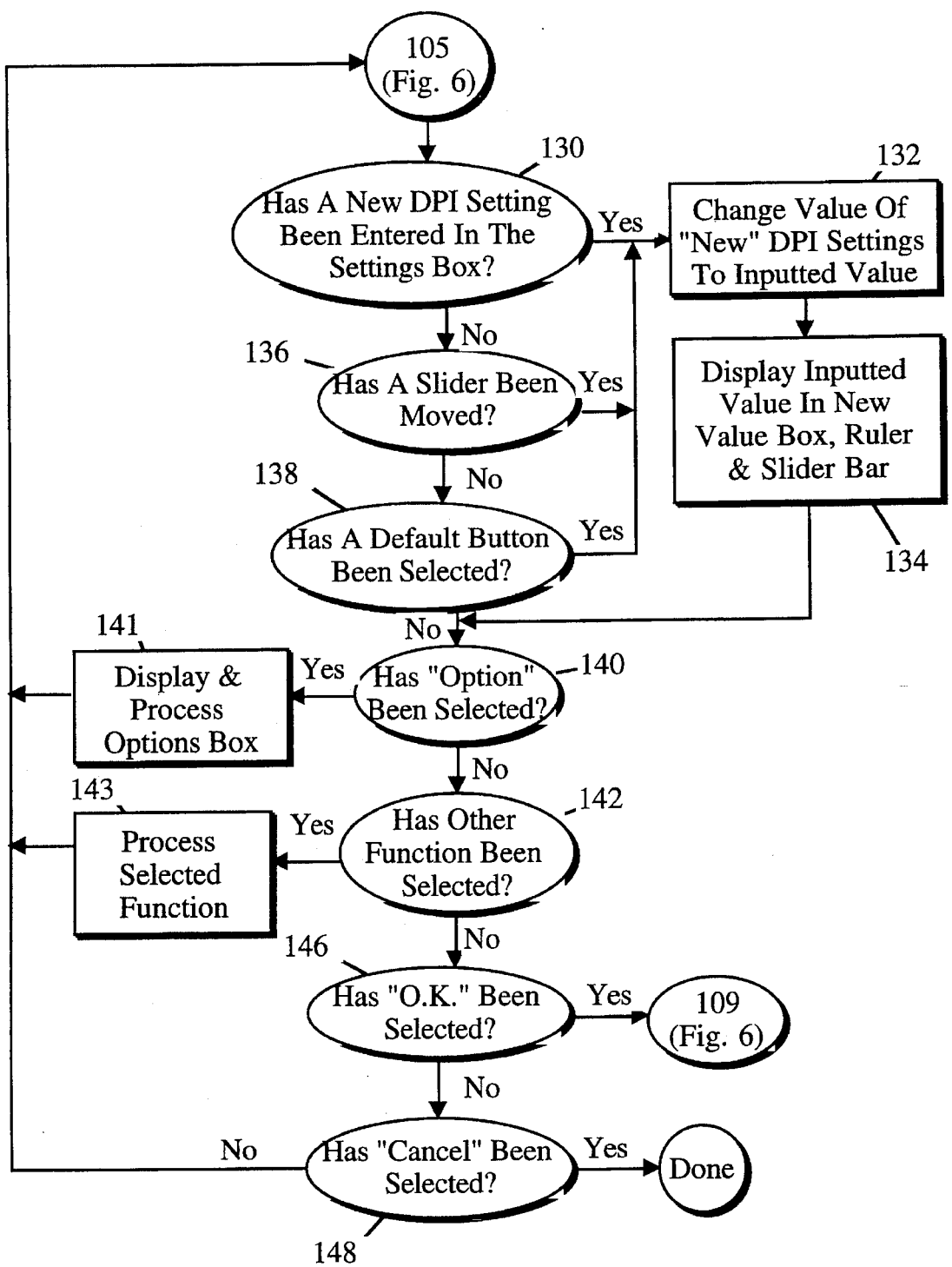
FIG. 7 is a flow diagram illustrating the user input processing steps 107 and 108 of the process set forth in FIG. 6.

Referring next to FIG. 7, the user input processing step 107 and 108 will be described in more detail. As indicated above, the dialog box displays the current and "new" DPI settings. The new settings are displayed in two manners. The first is numeric representations in the boxes 77 and 79. The second is a graphic representation in the form of rulers 83 and 84. The logic of the user input processing step in the described embodiment is shown in FIG. 7. Initially, the logic checks to determine whether a new DPI setting has been entered. This can be done in three ways. The first is inputting a value directly into a new settings box. This is checked in step 130. The second is by moving the slider which is checked in step 136. The third is by selecting a default button which is checked in step 138. When a new DPI setting is entered in any one of these manners, the logic moves to step 132 where the value of the "new" DPI settings is changed to the inputted value. Then, in step 134, the inputted value (i.e. the revised "new" DPI setting) is displayed in the appropriate new value box 77,79, in the appropriate ruler 83 or 84 and the appropriate slider box 86,87. Thereafter, the logic moves to step 140. Similarly, if no new DPI settings have been inputted, the logic will flow to step 140.

In step 140 the logic determines whether the "option" button has been selected. If so, the options dialog box is displayed and any user inputs are processed in step 14. If not the logic flows to step 142 where it determines whether any other specific functions have been selected such as the "help" function. If so, the selected function is processed as necessary. If not, the logic moves to step 146 where it checks to determine whether the "O.K." button has been selected. If so, this indicates that the user is satisfied with the "new" DPI settings and the logic proceeds to step 109 (described above) where the new DPI settings are stored. If the O.K. button has not been selected, the logic checks to determine whether the "cancel" button has been selected. If so, the user is indicating an intention to change the DPI settings at this time and the entire process is completed. If neither the "O.K." nor the "Cancel" button has been selected, the logic loops back to step 130 where it begins looking for new DPI setting changes. This process is continued until either the "O.K." or the "Cancel" button is selected.

In the foregoing explanation the process has been described as if the checking routine is serial in nature and constantly running. However, as will be appreciated by those skilled in the art, in practice such a checking algorithm is not specifically required. Rather, in practice, the various described checking steps (i.e. steps 130, 136, 138, 140, 142, 146, and 148) are call routines which are executed when called. The manner in which the functions are called is by selecting their associated buttons or writing in their associated boxes.

Figure 8:
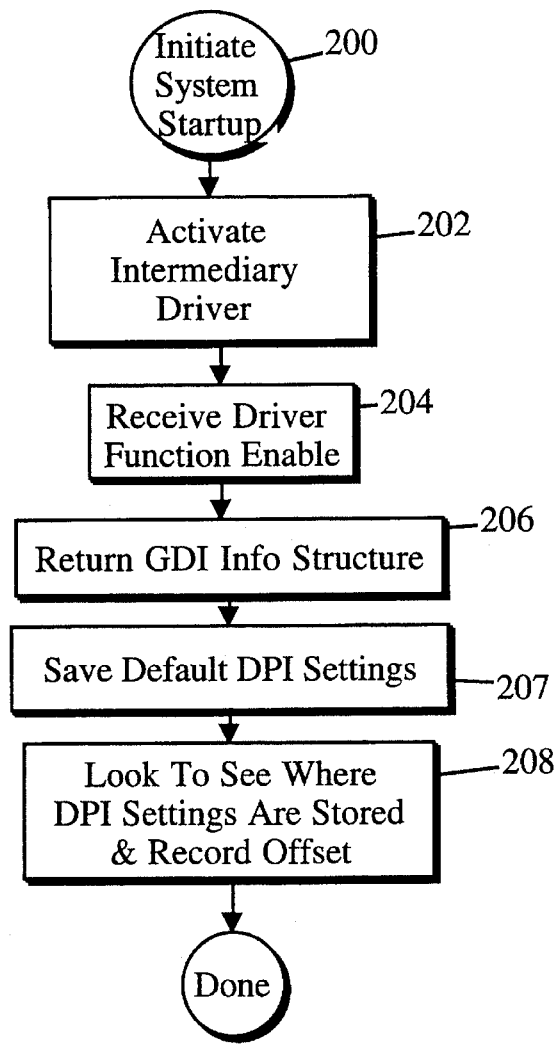
FIG. 8 is a flow diagram illustrating a method of recording the default DPI settings and the location at which the DPI settings are stored by the system.

Referring next to FIG. 8, a suitable method for detecting the system's storage location for the DPI settings will be described. The method begins at the initiation system startup (step 200). At some point during the startup, the driver is activated when the system loads the specified driver into an initialization file. When Microsoft Windows is used as the operating system, the specified driver is loaded into a windows initialization file called "SYSTEM.INI". In the described embodiment of the present invention, an intermediary driver utility is inserted between the system and the driver. The intermediary driver utility is specified in the initialization file rather than a specific driver. Step 202. At a later point, (step 204) the intermediary driver utility loads the appropriate display driver. The driver then returns a series of information about the display. This is written by the system into a GDI (Graphical Device Interface) Info Structure. Among the information returned are the X and Y DPI settings designated by the driver. The intermediary driver utility records these settings as the default DPI settings in step 207. Then, in step 208, the intermediary driver utility tracks the offset in the GDI Info Structure where the DPI settings are written. The actual memory offset locations are expected to vary from system to system, from machine to machine and even between boots on the same machine with some operating systems. After the memory offset location has been recorded, the process is completed and the operating system will continue with its startup routine.

Figure 9:
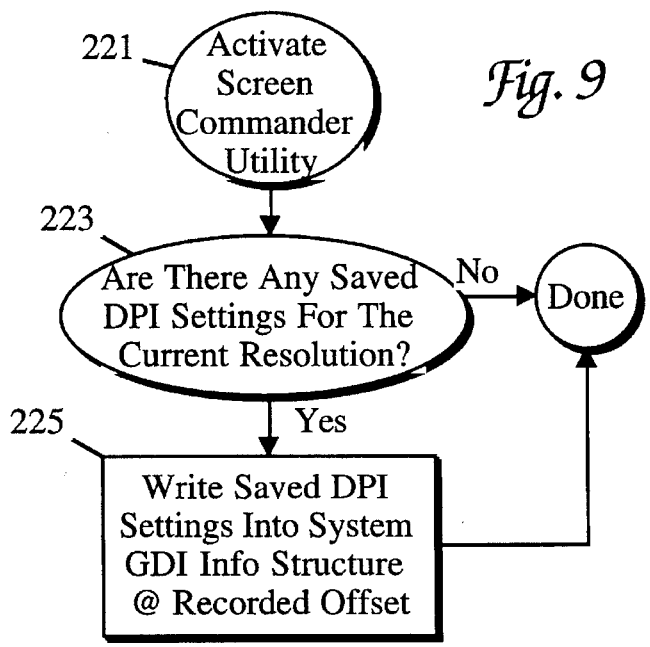
FIG. 9 is a flow diagram illustrating a method of restoring the DPI settings to user selected values after the operating system has been restarted.

It should be appreciated that when the computer system is shut down, the current DPI settings will be lost by the operating system. Thus, the next time the system is started, the display will return to the default DPI settings. In many situations, it may be desirable to automatically reset the DPI settings to the values selected by the user when the system is restarted. The manner in which this is accomplished will be described with respect to FIG. 9. As indicated above with reference to step 109, when new DPI settings are selected, the values are saved in a DPI application data file. The DPI application data file is stored in non-volatile memory. Therefore, when the operating system is rebooted, the information will be available. Referring specifically to FIG. 9, the automatic recall of the saved DPI settings begins when the user launches the screen commander utility. Step 221. This can be done in any conventional manner. Then, in step 223, the logic checks to determine whether there are any saved DPI settings in the DPI application data file that correspond to the current screen resolution. If so, the saved DPI settings are written into the system GDI info structure at the recorded offset in step 225. When this is accomplished, the selected DPI settings have been put in place and the recalling function is completed. On the other hand, if in step 223 it is determined that there are no stored DPI settings, then the recalling function is completed at that point.

In one preferred embodiment, the driver is set up somewhat different than many display drivers. Specifically, at Windows run time, only the intermediary driver utility is installed. The intermediary driver utility is a small section of code with a pointer table. The bulk of the code is saved in driver "libraries" such that each supported color depth has a unique library. Thereafter, when Windows makes its first call to the driver, the driver library for the selected color depth is loaded and initialized. The described intermediary driver installation technique is particularly well suited for use with the present invention since it allows the DPI settings to be recorded regardless of which driver is selected, without requiring each driver to be modified to record the settings. On the other hand, in other driver setups, each driver could be modified to record the default settings and the location in which the DPI settings are stored in the GDI file.

Although only one embodiment of the present invention with some variations has been described in detail, it should be understood that the present invention may be embodied in many other specific forms without departing from the spirit or scope of the invention. Particularly, in many instances, the ordering of the steps can be altered without defeating the purpose of the invention. Similarly, some steps can be eliminated and others added without departing from the scope of the invention. The invention has been described in conjunction with an IBM PC compatible personal computer using an MS-DOS based Windows operating system. However, the invention can also be adapted for use with other computers and operating systems as well. Therefore, the present examples are to be considered as illustrative and not restrictive, and the invention is not to be limited to the details given herein, but may be modified within the scope of the appended claims.

We claim:

1. A method of altering the display characteristics of a video display of a computer system that is operated under the control of an operating system, wherein the video display is controlled by a display driver that cooperates with the operating system, the display driver having a predetermined default dots per inch (DPI) setting indicative of the number of display pixels that are to be used to represent a designated length of printed output for a designated resolution, the default DPI setting being stored as a current DPI setting in a designated data structure, the method comprising the steps of:

determining the location of the current DPI setting in the designated data structure;

receiving an input indicative of a desired DPI setting; and storing the desired DPI setting in the location of the current DPI setting whereby the DPI settings for the entire operating system are changed without requiring any currently open application programs to be exited.

2. A method as recited in claim 1 further comprising the step of repainting the screen after the desired DPI setting has been stored.

3. A method as recited in claim 1 further comprising the steps of:

storing the desired DPI setting in a settings file stored in non-volatile memory; and at a system startup time, checking the settings file to determine whether a desired DPI setting has been stored and if so, storing the desired DPI setting in the location of the current DPI setting.

4. A method as recited in claim 1 further comprising the step of:

receiving an adjust DPI characteristic command from a user;

displaying a dialog box that displays the current DPI setting in response to the adjust DPI characteristics command; and displaying the desired DPI settings input by the user.

5. A method as recited in claim 4 wherein the desired DPI settings are displayed in both textual and graphic form.

6. A method as recited in claim 5 wherein the displayed graphic desired DPI settings include a vertically oriented ruler and a horizontally oriented ruler.

7. A method as recited in claim 6 wherein the displayed graphic desired DPI settings further include a pair of slider bars each having an associated slider for adjusting the DPI settings.

8. A method as recited in claim 1 wherein the computer system is arranged to support a plurality of resolutions and each supported resolution has a default DPI setting associated therewith, wherein the desired DPI settings are specific to a particular resolution.

9. A method as recited in claim 1 wherein the designated data structure is an operating system based data structure and the default DPI setting is stored when the operating system is initiated.

10. A method as recited in claim 1 wherein the operating system is Microsoft Windows and the designated data structure is a graphic device interface (GDI) information structure.

11. A method of setting the display characteristics of a video display wherein the video display is controlled by a display driver having a predetermined default dots per inch (DPI) setting indicative of the number of display pixels that are to be used to represent a designated length of printed output for a designated resolution, the default DPI setting for an operating system being stored as a current DPI setting in a designated data structure, the method comprising the steps of:

determining the location of the current DPI setting in the designated data structure;

checking a known location in a selected data file to determine whether a desired DPI setting has been saved; and when a desired DPI setting has been saved in the selected data file, storing the desired DPI setting in the location of the current DPI setting, whereby the DPI setting for the operating system are changed without requiring currently open application programs to be exited.

12. A method as recited in claim 11 further comprising the step of repainting the screen after the desired DPI setting has been stored.

13. A user interface for permitting a user to adjust the number of display pixels that correspond to a designated length of printed output having dot per inch settings (DPI settings), in a computer system having a display screen for displaying images and an operating system for controlling the execution of programs by the computer system, the operating system being arranged to access a designated data structure that includes a current DPI setting location that is used to store information indicative of the number of display pixels that correspond to a designated length of printed output for a designated resolution, the user interface comprising:

means for determining the current DPI setting location;

means for receiving an input indicative of a desired new DPI setting; and means for storing the desired new DPI setting in the current DPI settings location whereby the DPI settings for the operating system are changed without requiring currently open application programs to be exited.

14. A user interface as recited in claim 13 further comprising means for displaying the current DPI setting and the desired new DPI setting.

15. A user interface as recited in claim 14 wherein the display means includes a graphic display that displays the desired DPI setting in the form of a ruler.

16. A user interface as recited in claim 15 wherein the graphic display further comprising a slider bar having a slider thereon that the user may use to adjust the desired DPI setting.

17. A user interface as recited in claim 15 wherein the graphic display includes a pair of rulers including a horizontally oriented ruler and a vertically oriented ruler.

18. A user interface as recited in claim 14 further comprising a default button for permitting the user to automatically select a default DPI setting as the desired DPI setting.

19. A user interface as recited in claim 14 wherein the display means includes a plurality of display boxes for displaying the current and desired DPI settings.

20. A user interface for permitting a user to adjust the number of display pixels that correspond to a designated length of printed output having dot per inch settings (DPI settings), in a computer system having a display screen for displaying images and an operating system for controlling the execution of programs by the computer system, the operating system including a designated data structure that includes a current DPI setting location that is used to store an indication of the number of display pixels that correspond to a designated length of printed output for a designated resolution, the user interface comprising:

means for determining the current DPI setting location;

means for receiving an input indicative of a desired new DPI setting;

a pair of graphic rulers that display respective horizontal and vertical desired DPI settings in the form of rulers, each ruler having an associated slider bar having a slider thereon that the user may use to adjust the desired DPI setting a plurality of display boxes for displaying the current and desired DPI settings in alphanumeric form;

a button for permitting the user to automatically select the default DPI settings as the desired DPI settings; and means for storing the desired new DPI setting in the current DPI settings location, whereby the DPI settings for the entire operating system are changed without requiring currently open application programs to be exited.

\* \* \* \* \*